US009535987B2

(12) United States Patent
Ponting

(10) Patent No.: US 9,535,987 B2
(45) Date of Patent: Jan. 3, 2017

(54) "AT LEAST" OPERATOR FOR COMBINING AUDIO SEARCH HITS

(71) Applicant: Aurix Limited, Worcestershire (GB)

(72) Inventor: Keith Michael Ponting, Worcestershire (GB)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/005,661

(22) Filed: Jan. 25, 2016

(65) Prior Publication Data

US 2016/0140223 A1 May 19, 2016

Related U.S. Application Data

(63) Continuation of application No. 13/629,589, filed on Sep. 27, 2012, now Pat. No. 9,275,139.

(60) Provisional application No. 61/617,741, filed on Mar. 30, 2012.

(51) Int. Cl.
G06N 99/00 (2010.01)
G10L 15/06 (2013.01)
G10L 15/18 (2013.01)
G06F 17/30 (2006.01)

(52) U.S. Cl.
CPC ..... *G06F 17/30755* (2013.01); *G06F 17/3053* (2013.01); *G06N 99/005* (2013.01); *G10L 15/063* (2013.01); *G10L 15/18* (2013.01)

(58) Field of Classification Search
CPC .................. G06F 17/30867; G06F 17/30864; G06F 17/30613; G06F 17/30761; G10L 15/16
See application file for complete search history.

(56) References Cited

U.S. PATENT DOCUMENTS

| 5,884,259 | A | 3/1999 | Bahl et al. |
| 5,974,381 | A | 10/1999 | Kubota |
| 6,185,527 | B1 | 2/2001 | Petkovic et al. |
| 6,246,982 | B1 | 6/2001 | Beigi et al. |
| 6,434,520 | B1 * | 8/2002 | Kanevsky ......... G06F 17/30746 704/243 |
| 6,862,713 | B1 | 3/2005 | Kraft et al. |

(Continued)

OTHER PUBLICATIONS

Mingchun, Liu et al.; "A Fuzzy Logic Approach for Content-Based Audio Classification and Boolean Retrieval"; Fuzzy Logic and the Internet; 2004; pp. 135-156; Springer-Verlag Berlin Heidelberg; Berlin, Germany.

(Continued)

*Primary Examiner* — Matthew Baker
(74) *Attorney, Agent, or Firm* — Stevens & Showalter, LLP

(57) ABSTRACT

System and method to search audio data, including: receiving audio data representing speech; receiving a search query related to the audio data; compiling, by use of a processor, the search query into a hierarchy of scored speech recognition sub-searches; searching, by use of a processor, the audio data for speech identified by one or more of the sub-searches to produce hits; and combining, by use of a processor, the hits by use of at least one combination function to provide a composite search score of the audio data. The combination function may include an at-least-M-of-N function that produces a high score when at least M of N function inputs exceed a predetermined threshold value. The composite search score employ a soft time window such as a spline function.

20 Claims, 14 Drawing Sheets

(56) References Cited

U.S. PATENT DOCUMENTS

| | | |
|---|---|---|
| 7,310,600 B1 | 12/2007 | Garner et al. |
| 7,725,318 B2 | 5/2010 | Gavalda et al. |
| 7,788,095 B2 | 8/2010 | Wasserblant et al. |
| 7,904,296 B2 | 3/2011 | Morris |
| 8,027,999 B2 | 9/2011 | Coffman et al. |
| 8,055,503 B2 | 11/2011 | Scarano et al. |
| 8,209,171 B2 | 6/2012 | Abbott et al. |
| 8,311,828 B2 | 11/2012 | Arrowood et al. |
| 8,423,363 B2 | 4/2013 | Gupta et al. |
| 8,543,582 B1 | 9/2013 | Granström |
| 8,687,946 B2 | 4/2014 | Sathish et al. |
| 8,719,016 B1 | 5/2014 | Ziv et al. |
| 8,831,946 B2 | 9/2014 | Mamou |
| 2007/0033003 A1 | 2/2007 | Morris |
| 2007/0271241 A1 | 11/2007 | Morris et al. |
| 2008/0201143 A1 | 8/2008 | Olligschlaeger et al. |
| 2008/0270138 A1 | 10/2008 | Knight et al. |
| 2010/0274667 A1 | 10/2010 | Lanham et al. |
| 2010/0324900 A1 | 12/2010 | Faifkov et al. |
| 2014/0067374 A1 | 3/2014 | Wilkins et al. |

OTHER PUBLICATIONS

Wright, Jerry H. et al.; "Improved Topic Spotting Through Statistical Modelling of Keyword Dependencies"; May 1995; IEEE Publications; pp. 313-409; Piscataway, New Jersey.

Yasseen, Kalim; Examination Report; Great Britain Application No. 1217354.8; Jul. 3, 2014; United Kingdom Intellectual Property Office; South Wales, Great Britain, United Kingdom.

Yasseen, Kalim; Report Under Section 17(5)(b); Great Britain Application No. 1217354.8; Dec. 24, 2012; United Kingdom Intellectual Property Office; South Wales, Great Britain, United Kingdom.

Tong, Zhang et al.; "Hierarchical System for Content-Based Audio Classification and Retrieval"; SPIE Conference on Mutlimedia Storage and Archiving Systems III; Nov. 1998; SPIE vol. 3527, pp. 398-409; Boston, Massachusetts.

Baker, Matthew H.; Office Action; U.S. Appl. No. 13/629,589; Apr. 23, 2015; United States Patent and Trademark Office; Alexandria, Virginia.

Baker, Matthew H.; Office Action; U.S. Appl. No. 13/629,589; Jul. 23, 2015; United States Patent and Trademark Office; Alexandria, Virginia.

Baker, Matthew H.; Notice of Allowance and Fees Due; U.S. Appl. No. 13/629,589; Oct. 6, 2015; United States Patent and Trademark Office; Alexandria, Virginia.

Related U.S. Appl. No. 13/629,589; Titled: "At Least" Operator for Combining Audio Search Hits; filed Sep. 27, 2012 by Keith Michael Ponting.

* cited by examiner

"AT LEAST" OPERATOR FOR COMBINING AUDIO SEARCH HITS

CROSS-REFERENCE TO RELATED APPLICATIONS

This application is a continuation of U.S. patent application Ser. No. 13/629,589, filed on Sep. 27, 2012, which claims the benefit of U.S. provisional application No. 61/617,741, filed Mar. 30, 2012, entitled "'At least' Operator for Combining Audio Search Hits," the content of both of which are hereby incorporated by reference in their entirety.

BACKGROUND

Field of the Invention

System and method for searching for audio portions of an audio-containing file or streaming audio-containing link, and combining occurrences of the detected audio portions into an overall relevancy score.

Description of Related Art

Searching audio material is typically a non-deterministic process, characterized by the association of relevancy scores with each possible match found. Simple queries search for occurrences of an individual word or phrase. Compound queries are used to search for the occurrences of combinations of words, phrases and other compound queries. The search mechanism is required to compute a compound relevancy score from the constituent relevancy scores.

When searching information stored or available in a computerized medium (e.g., stored audio files or streaming audio communication link), there are two known approaches for combining partial matches into an overall relevancy score: (1) normal Boolean operators, so that "at least 2 of 3" could be formally expressed as (A and B and not C) or (A and C and not B) or (B and C and not A) or (A and B and C); (2) the use of weighted combinations of hit counts as reported in the art.

The specification of at least M of N via Boolean operators is extremely complex. Current audio search systems do not formally apply probability calculus, so the mathematically correct expression is usually simplified to reporting a hit if hits are scored for (A and B) or (B and C) or (C and A) in the at least 2 of 3" case. As N and M increase, these expressions become longer and longer—for example there are three ways of selecting two from three, as shown, but forty-five distinct ways of selecting two from ten.

Some approaches known in the art are based on weighted combinations of hit counts and require labeled audio training data to derive the weights. The art does not specify how weights can be derived in the absence of such labeled data and does not describe a method for incorporating the individual hit relevancy scores into this process. The art thresholds individual hit scores and subsequently derives hit counts by treating each hit with a score above threshold as being a definite hit.

Some processes known in the art describe a process in which the weights are obtained as "usefulness" scores, but this also requires labeled audio training data.

A process known in the art for audio information retrieval is to apply speech-to-text methods and then use normal text retrieval approaches. This technique is less relevant as the final operation tends to be a support vector machine, again trained on pre-labeled data.

SUMMARY

Embodiments of the present invention generally relate to a system and method for searching audio files or streaming audio communication links for the occurrence of at least M of N search terms in an audio sample. Embodiments in accordance with the present invention provide an efficient method for specifying and computing the scores for a particular type of compound query, based on the occurrence of at least M of N possible constituents.

Embodiments in accordance with the present invention provide a system and method to search audio data, the method including: receiving audio data representing speech; receiving a search query related to the audio data; compiling, by use of a processor, the search query into a hierarchy of scored speech recognition sub-searches; searching, by use of a processor, the audio data for speech identified by one or more of the sub-searches to produce hits; and combining, by use of a processor, the hits by use of at least one combination function to provide a composite search score of the audio data. The combination function may include an at-least-M-of-N function that produces a high score when at least M of N function inputs exceed a predetermined threshold value. The composite search score employ a soft time window such as a spline function.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
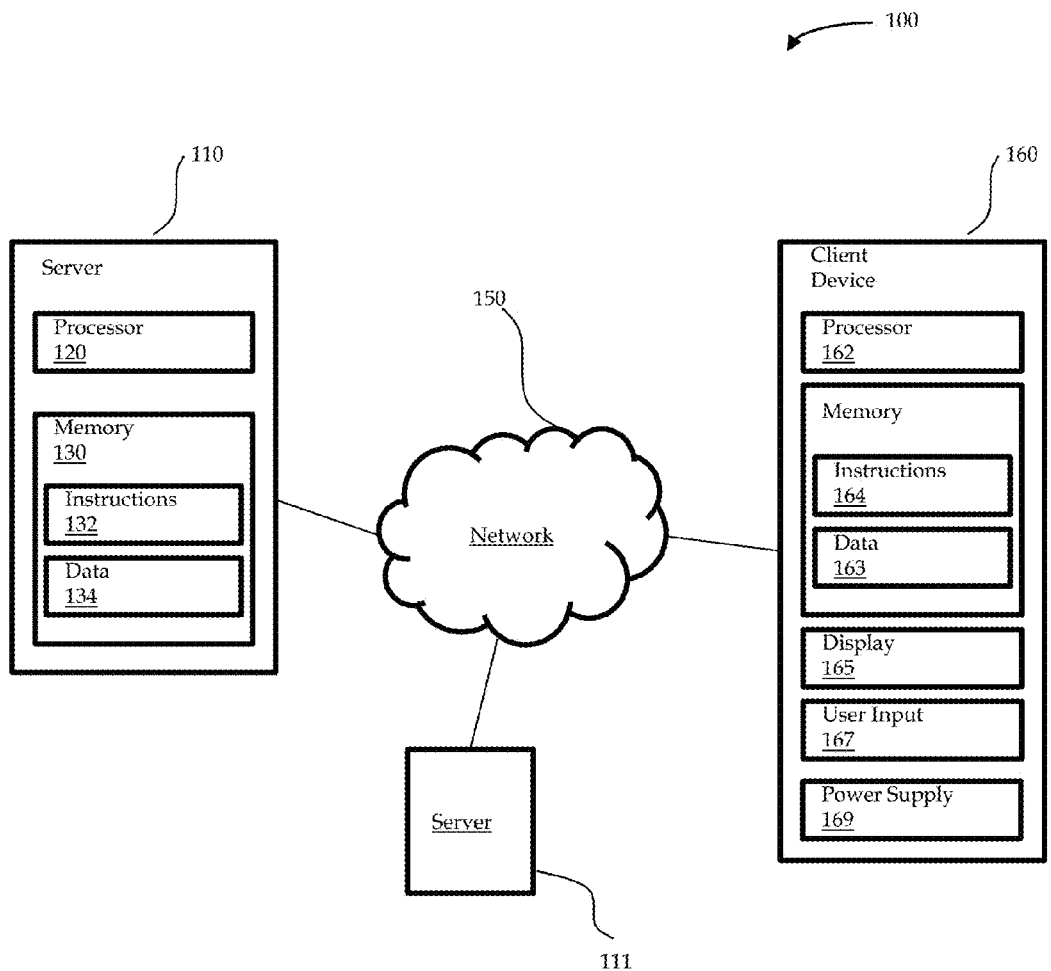
FIG. 1 is a functional diagram of a system according to one embodiment in accordance with the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

Aspects of the disclosure provide a concise method for specifying that at least M of some number N of possible search terms have been found within some audio stream or time interval within the audio stream. Methods disclosed herein may be adapted to searching for text within a file containing text, or within streaming information that contains text.

Embodiments in accordance with the present invention may be usable to search for an audio sample within an audio stream or audio file. Such an application may be referred to herein as audio mining. In an audio mining context, items have an associated score, so that part of the combination process involves appropriate mechanisms to combine the scores, thereby making the original inputs and the combinations into "soft attributes."

Embodiments in accordance with the present invention transform raw data that is to be searched (e.g., audio data, text data, etc.) by creating an index form of the raw data, and then use the index form of the raw data when searching.

Embodiments in accordance with the present invention may provide one or more of:
  Generation and handling of the scores;
  Replacement of a hard-edged, or rectangular search time window by a soft version based on spline functions;
  Training and self-learning of at least a portion of the parameters from audio data; and
  Implementation including the "at least" operator.

Embodiments in accordance with the present invention provide a mechanism for the handling of multiple hits for the same search term and for the handling of overlapping hits.

Embodiments in accordance with the present invention provide a mechanism in which a combination of scores in the "at least" case can be enhanced or provide additional weighting to favor instances with more than the minimum threshold. Such weighting may produce results that are more closely relevant to the original query.

Combination functions in accordance with an embodiment of the present invention may be specified via an API function, which indicates the list of search terms and the minimum count N, or an equivalent GUI dialogue.

An advantage of combination functions lies in the efficiency of specification—the Boolean approach requires the explicit enumeration of all the ways in which M can be selected from N followed by an "or" operation to allow any one of those to be chosen.

The explicit representation of the "at least" concept also allows the score combination function to be modified in order to favor regions where there are hits for more than M terms. For example, suppose we are searching for "2 out of 5", and two hits are observed during a certain time interval. This will result in a first score, but it is possible that one of these two hits is a false alarm. On the other hand, if we are searching for "2 out of 5", and four hits are observed during the same time interval, then a second score will result. Because having three (out of five) being false alarms are less likely than one false alarm during the time interval, the second score will be higher than the first score, but not necessarily twice as high.

Given the propensity for audio search systems to generate false alarms, a region with extra hits should, other things being equal, score more highly than one with exactly M hits—this is very difficult to accomplish with the Boolean decomposition approach. As an example of such a modification, suppose there are hits for M+E search terms and that the combined score for the best M hits is $G_M$. Then the scores for the remaining E hits may be incorporated using a logistic expression in order to guarantee that (a) adding the extra hits does not reduce the score below $G_M$ and (b) the composite score does not exceed the upper limit on relevancy scores, typically 100. Specifically, suppose the M+E search terms are indexed in order of decreasing relevancy score and have relevancy scores $r_k$, k=1, . . . , M+E. Then $G_M$ is computed using the unmodified score combination function from $r_k$, k=1, . . . , M. The exemplary modification is that the overall score is computed as: $G_{M+E}=x(y(G_M,l,u)+a(y(r_{M+1},l,u)+ \ldots +y(r_{M+E},l,u))$, where: u is the upper limit on relevancy scores; l=−u if all relevancy scores lie between zero and u; a is an arbitrary constant, typically 0.2; y(z,l,u) is the generalized "logit" function defined by y(z,l,u)=p/(1−p) where p=(z−l)/(u−l) and x(y,l,u) is its inverse, logistic, function defined by $x(y,l,u)=l+q*(u-l)$ where $q=1/(1+e^{-y})$. One skilled in the art will appreciate that these function definitions may be accompanied by appropriate definitions for the endpoints such as z=u where the values become infinite.

Figure 2:
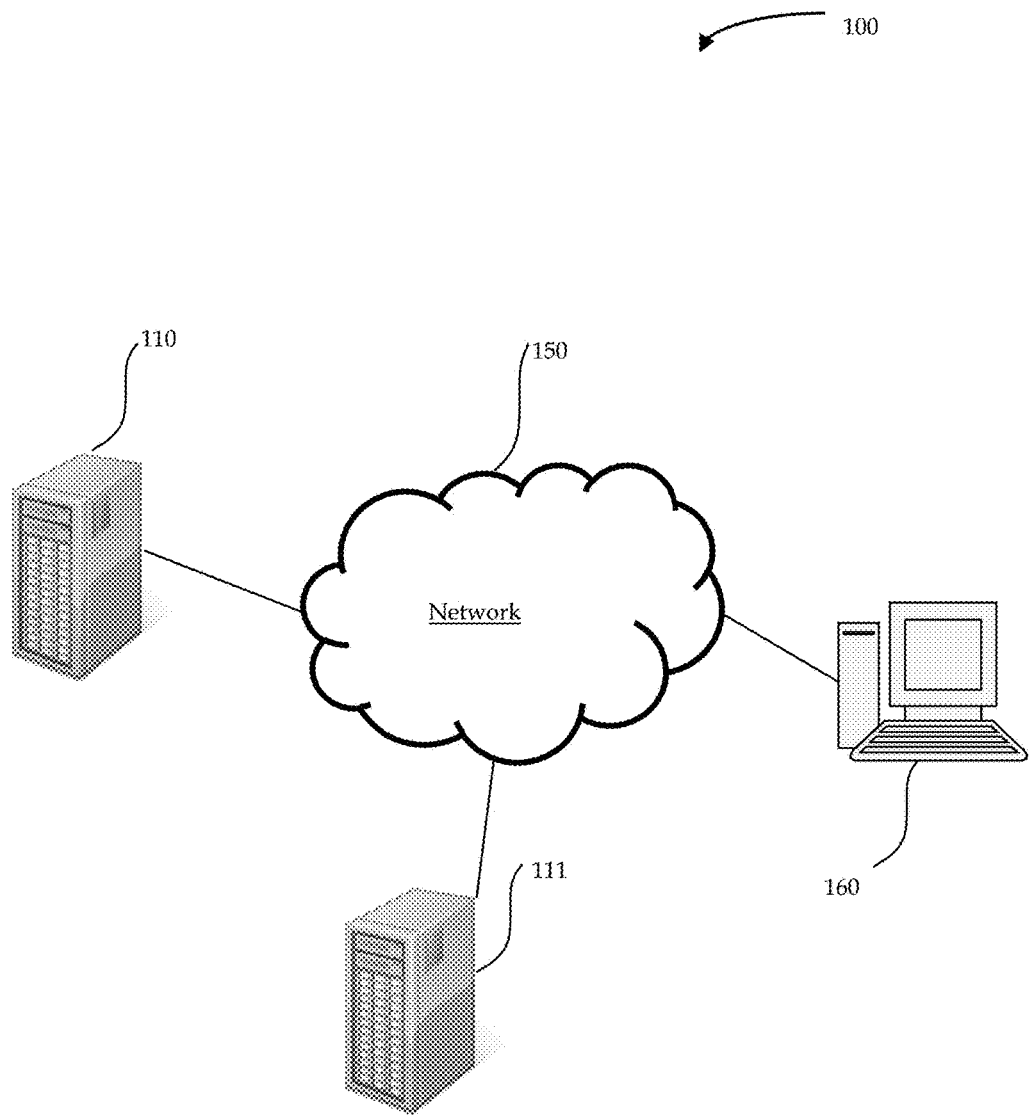
FIG. 2 is a pictorial diagram of the system of FIG. 1 in accordance with an embodiment of the present invention.

As shown in FIGS. 1-2, a system 100 in accordance with one aspect of the present technology includes computer 110 containing a processor 120, memory 130 and other components typically present in general purpose computers.

The server 110 may be at one node of a network 150 and may be capable of directly and indirectly receiving data from and sending data to other nodes of the network. For example, server 110 may be capable of receiving data from client device 160 via network 150 such that server 110 uses network 150 to transmit and display information to a user on display 165 of client device 160. Similarly, server 110 may, for example, comprise a web server that is capable of receiving data from a server 111 such that server 110 uses network 150 to transmit information to server 111.

Server 110 may also comprise a plurality of devices that exchange information with different nodes of a network for the purpose of receiving, processing and transmitting data to client devices. In this instance, a client device will typically still be at different nodes of the network than any of the devices comprising server 110. Although server 110 is shown external to network 150, server 110 may be part of network 150.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, solid-state drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as any commercially available CPU. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors, computers or memories that may or may not operate in parallel.

Network 150 may be any telecommunications network such as, for example, the Internet, a Wide Area Network (WAN), a Local Area Network (LAN), the Public Switched Telephone Network (PSTN), WiFi, a cellular network, and an Integrated Digital Services Network (ISDN). Furthermore, network 150 may include one or more telecommunications networks with various configurations and may use various protocols such as, for example, VoIP, TCP/IP, proprietary protocols, instant messaging, HTTP and SMTP, and various combinations of the foregoing. Although only a few computers are depicted in FIGS. 1-2, it should be appreciated that a typical system can include a large number of connected computers.

Client device 160 may be any type of general purpose computer, such as, for example, a telephone, a cellular telephone, a Personal Computer (PC), a Personal Digital Assistant (PDA), a tablet PC, or a conference room video system. Furthermore, client device 160 may be configured similarly to server 110, as described above, and may include various components such as, for example, a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), user input 167 (e.g., a mouse, keyboard, touch-screen or microphone), a battery power supply 169 or other power source, a network interface device, and all of the components used for connecting these elements to one another. Although shown as a single device, client device 160 may be distributed between multiple devices. For example, client device 160 may be distributed between a telephone and a personal computer.

In addition to the operations described below and illustrated in the figures, various operations in accordance with aspects of the present technology will now be described. It should also be understood that the following operations do not have to be performed in the precise order described below. Rather, various steps can be handled in a different order or simultaneously. Steps may also be removed or added.

Figure 3:
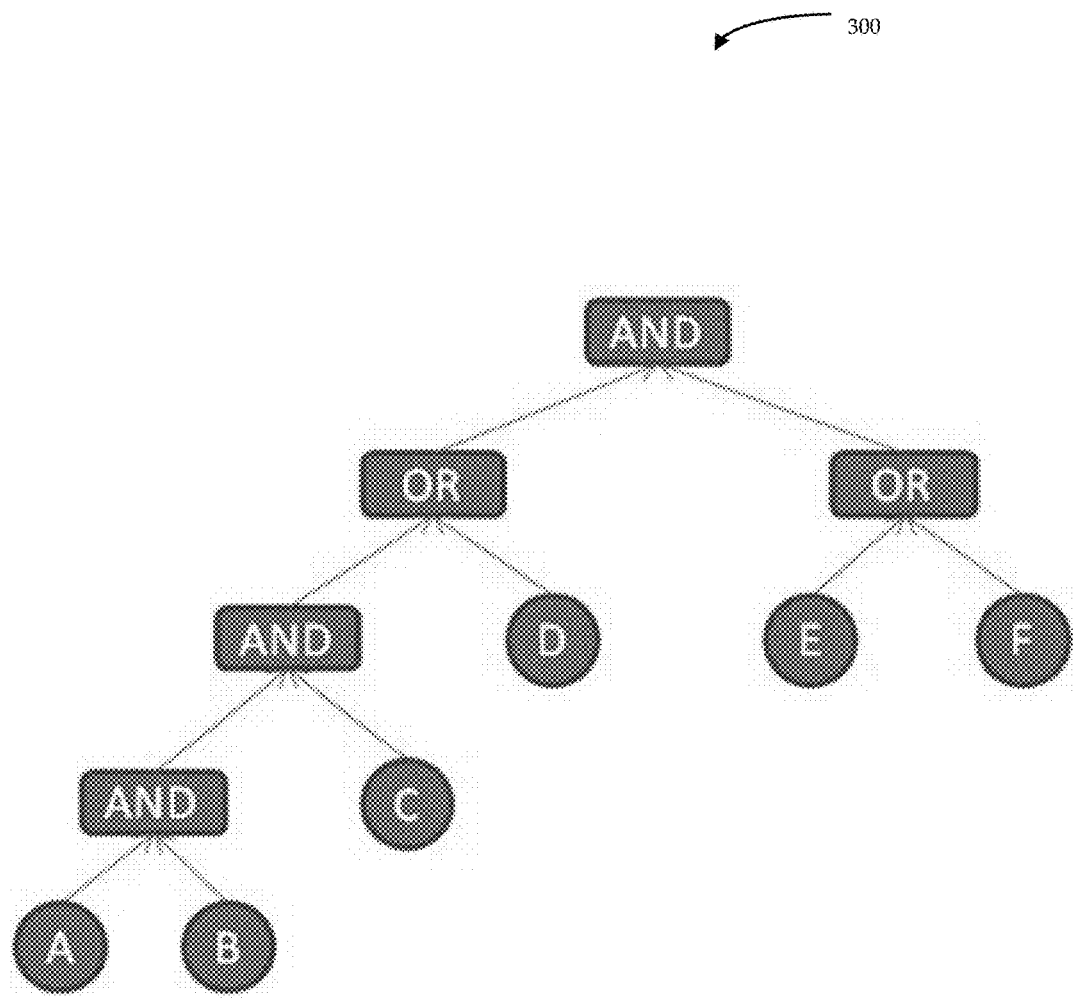
FIG. 3 illustrates a standard "Boolean" tree.

FIG. 3 illustrates a standard "Boolean" tree 300 of the background art, involving inputs and binary operators, such as "and", "or", "not." A Boolean logical expression depicted by the tree of FIG. 1 may be: (((A and B) and C) or D) and (E or F).

Note that "not" operations, a typical component of Boolean logic, are not easy to define for audio search, because the statistical nature of the process means that many false alarms are found with very weak match scores, and it is not clear how to convert a weak match for A into a score for "not A", for example.

Embodiments in accordance with the present invention are better understood by replacing the use of Boolean operators with combination functions that allow more than two inputs. For example, by use of combination functions, the logical expression depicted in FIG. 3 may be rewritten as shown below in Equation (1):

$$\text{ALL}(\text{ANY}(\text{ALL}(A,B,C),D),\text{ANY}(E,F)) \qquad (1)$$

Figure 4:
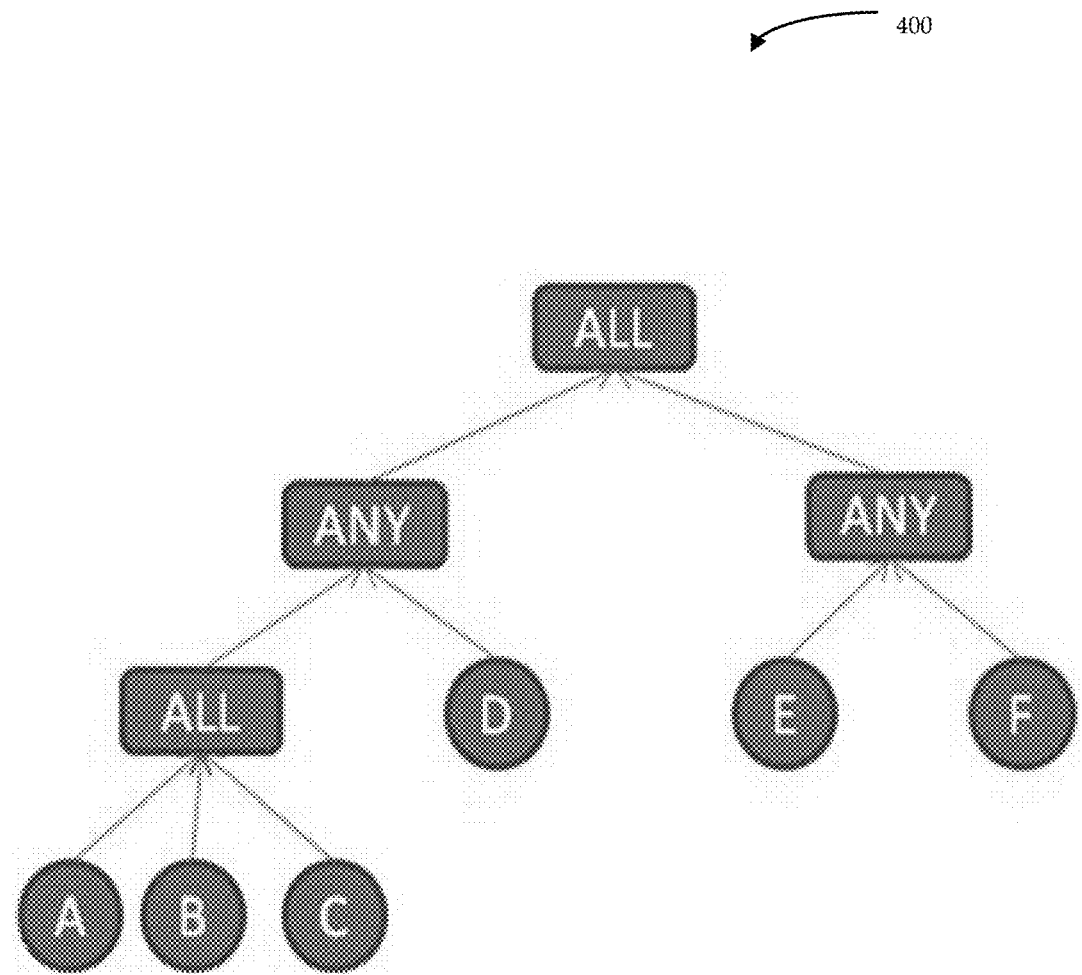
FIG. 4 illustrates a logical tree that uses combination functions to achieve the same effect as the Boolean tree of FIG. 3.

FIG. 4 illustrates a logical tree 400 that uses combination functions, as known in the background art.

Figure 5:
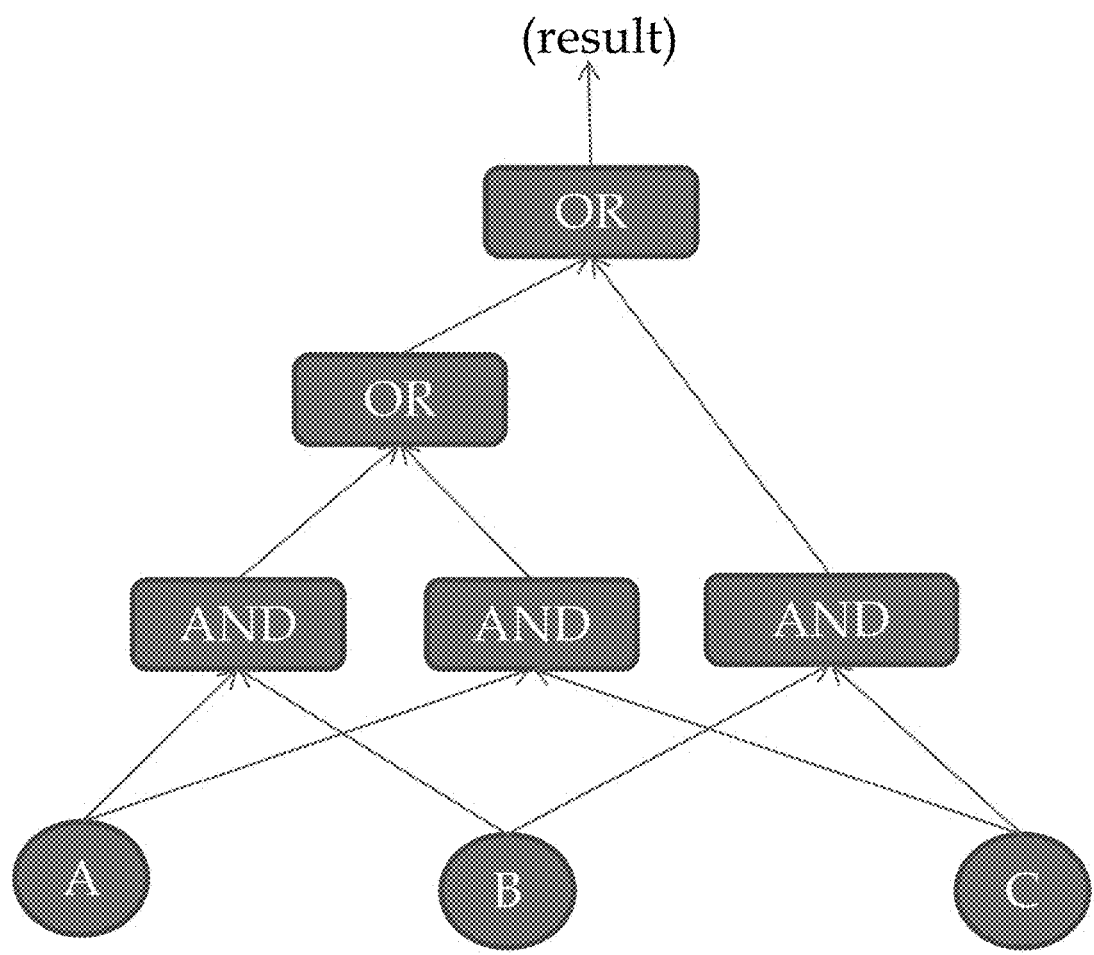
FIG. 5 illustrates the construction of an "at least two of three" query using standard Boolean operations.

FIG. 5 illustrates a standard "Boolean" tree 500 of the background art, involving three inputs and binary operators, such as "and", "or", "not." A Boolean logical expression depicted by tree 500 of FIG. 5 will be true as long as at least two of the three binary inputs are true.

One or more of the combination functions (e.g., the ALL function) may be defined over, or constrained to operate within, a predetermined time interval.

Embodiments in accordance with the present invention may provide an "at least" operator via a weighted summation, giving each distinct search term a weight of 1, so that if there were hits on two of the three terms, the weighted sum would become 2, and a composite hit declared if the weighted sum, which in this adaptation reduces to just the count of distinct terms for which there are hits above threshold, exceeds, say, 1.5

The "at least" operator allows the user to specify that, given a specification comprising a number (N) of search terms (which may be words, phrases or other combinations in a search hierarchy), another number (M) and an audio region, a composite hit is to be declared (or propagated further up the hierarchy) if that region contains hits for at least M of those search terms. If the input terms have associated relevancy scores, a suitable function, such as median, maximum, arithmetic mean or geometric mean, may be applied in order to compute a score associated with the composite hit.

Figure 6:
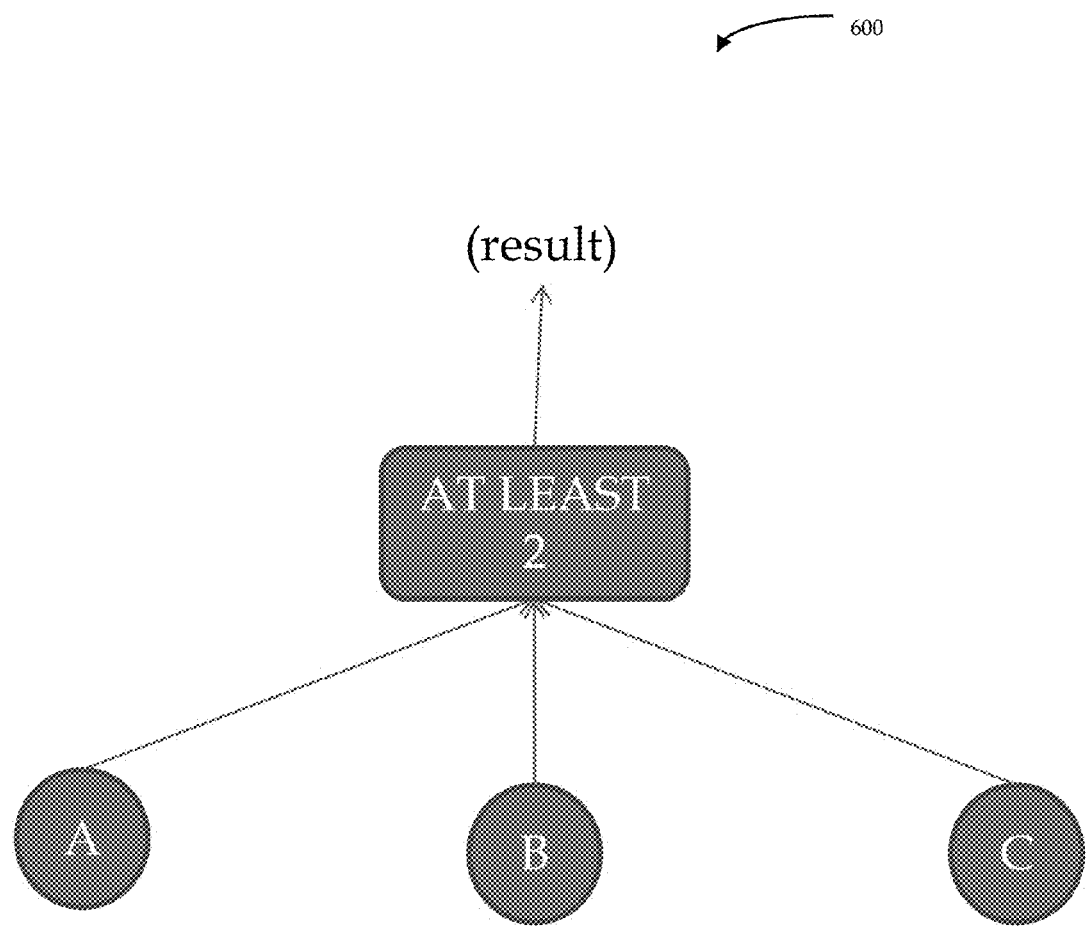
FIG. 6 illustrates the construction of an "at least two of three" query in accordance with an embodiment of the present invention.

FIG. 6 illustrates a logic tree 600 in accordance with an embodiment of the present invention, involving three inputs and the "at least" operators. Process 600 transforms a collection of at least two and possibly many more inputs (e.g., search hits for a specified set of search terms), and scores then into a single composite logical result. The logical result of process 600 is equivalent to the logical result of logic tree 500, yet logic tree 600 is simpler than logic tree 500.

Figure 7:
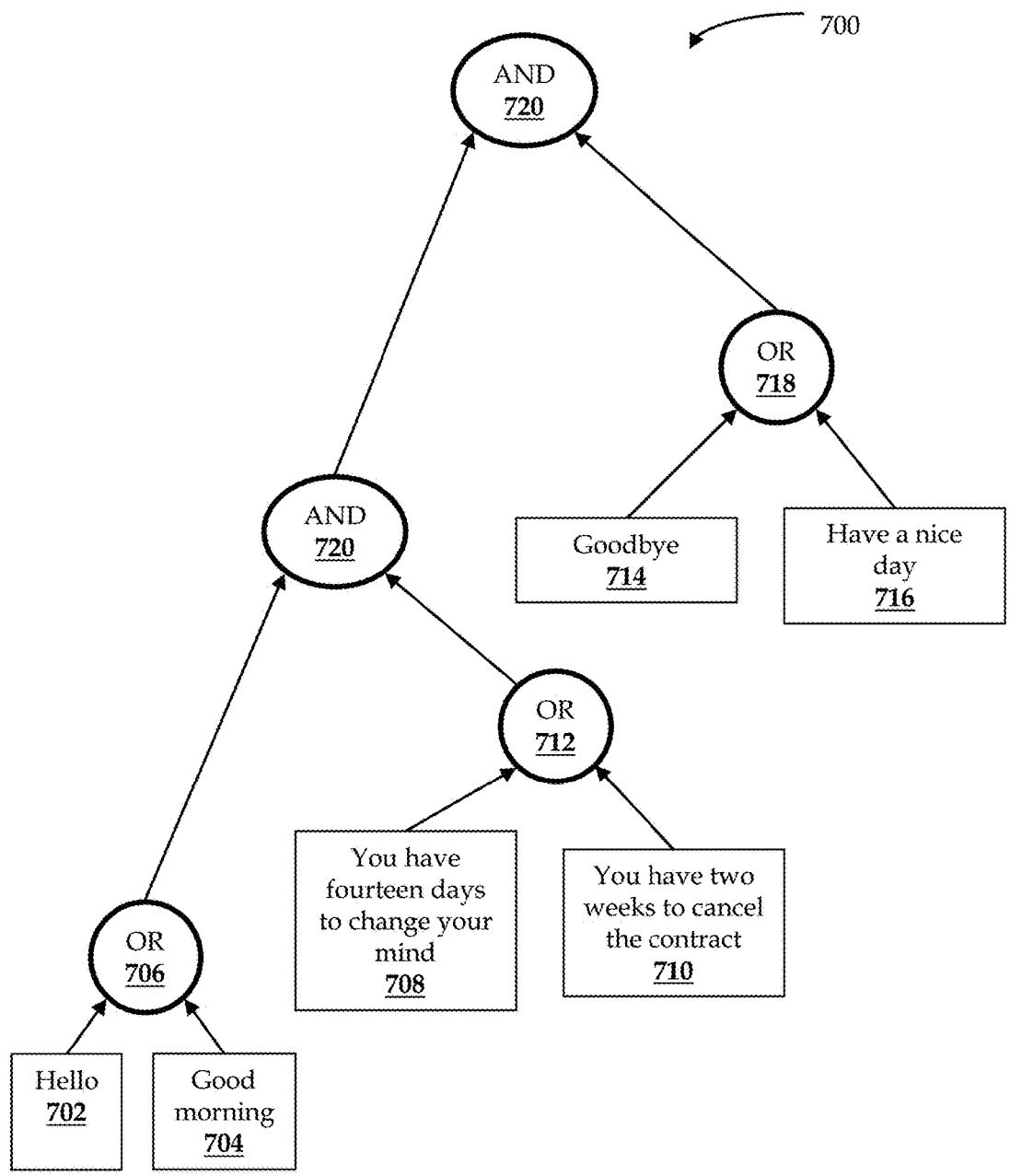
FIG. 7 illustrates an example of a Boolean tree used in a call center compliance application.

FIG. 7 illustrates a logic tree 700 in accordance with a standard "Boolean" tree of the background art, for monitoring agent performance in a call center, involving an exemplary call center call structure and binary operators. In accordance with logic tree 700, an appropriate call structure may be one which includes, (1) an appropriate greeting (nodes 702 or 704); (2) a "cooling-off period" statement (nodes 708 or 710); and (3) an appropriate signoff (nodes 714 or 716). It would be unusual for the greeting not to be at or near the start, or for the signoff not to be at or near the end, but that information is not encoded in the tree as shown. Furthermore, logic tree 700 illustrates that for at least part of the call, multiple statements may be satisfactory. For example, if either node 702 or node 704 is a component of an audio-containing file, then Boolean operator 706 is true.

Figure 8:
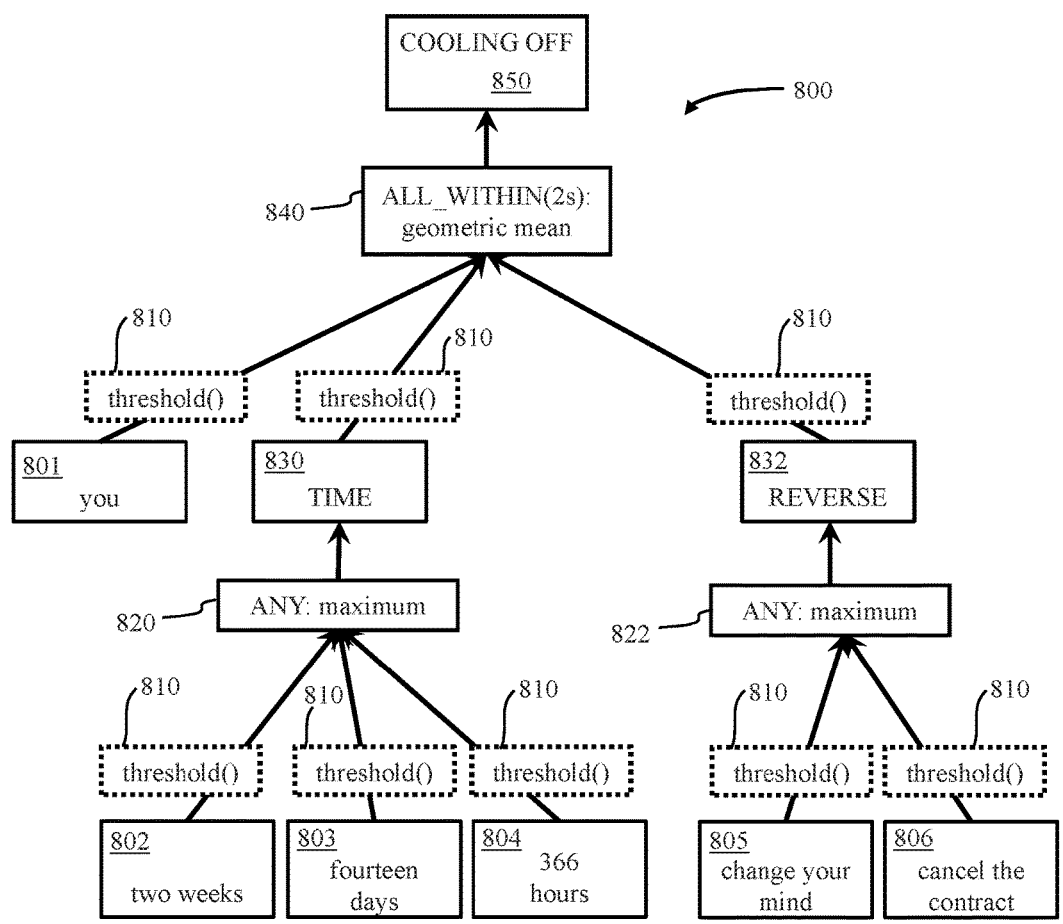
FIG. 8 illustrates processing a compound query using combination functions.

FIG. 8 illustrates a hierarchical logic tree 800, which both expands on the range of possible phrases given in blocks 708, 710, and 712 from FIG. 7 and illustrates how these might be processed, in a practical implementation for monitoring agent performance in a call center by the call center itself. The call center agent is supposed to speak one or more of an allowed combination of words. An automated quality monitoring process within the call center receives an audio recording of the agent and uses audio mining to search the recorded audio for one or more of the allowed combinations or subsets of words in order to check that the operator has behaved as required. FIG. 8 represents part of the automated quality monitoring process in the call center. In general, embodiments in accordance with the present invention search the audio for the presence of information or a concept, which may be worded in several ways. In the embodiment of FIG. 8, the concept is an advisement of a right to cancel. The concept may include a noun, a verb, and an object. Embodiments search for members of expected sets of words that identify each of the noun, the verb, and the object, respectively. When some threshold number of the set members is found sufficiently close in time to each other, then embodiments in accordance with the present invention declare that the concept has been found. The threshold number may be, e.g., at least one member of each set, or M-of-N (i.e., at least "M" members found within a set having a membership size of "N", wherein N is greater than or equal to M), and so forth.

In general, an audio mining process may make two kinds of errors: (1) a false positive error, i.e., reporting a word/phrase hit when in fact the audio did not contain that word/phrase; and (2) a false negative, i.e., missing a word/phrase that is in fact present in the audio.

There are many variations on the phrases shown in blocks 708 and 710 which convey the same basic meaning, for example: "you have fourteen days to cancel the contract", "you've got two weeks to change your mind" or even "you must let us know within 336 hours if you want to change your mind". What all these examples have in common is the word "you", a specification of a given time interval, and an expression indicating a wish to cancel and that these components all occur sufficiently close together to be part of the same sentence. The padding words in between ("must let us know" etc.) do not detract from the meaning and may be ignored, although in practice in a contact center the management does not wish to see too much padding, so that "sufficiently close together" might be expressed as a very short time interval, e.g., two seconds, in which case the wordier forms are unlikely to match. The time specification substrings are shown in FIG. 8 in blocks 801-803, the wish to cancel in blocks 804 and 805 and the word "you" in block 801. The number of blocks are not limited in this regard, and additional and/or different blocks may be used, depending upon the vocabulary of the agent (e.g., a script), or the type of products or problems handled by the call center, and so forth.

FIG. 8 illustrates an embodiment of achieving this process with combination functions. The individual search terms and phrases are represented by blocks 801-806. When the audio is searched for these phrases, any matches found are returned in the form of search hits (i.e., matches), the search hits including an identifier, indicating what has been matched, a time interval over which the match is declared and a relevance score. Search hits for these phrases may be screened by optional threshold units 810, which block search hits with scores below a specified threshold. Thresholds at individual threshold units 810 may be different at one or more threshold unit 810. Thresholds applied to the confidence scores allow embodiments of the invention to vary a trade-off between false positive errors and false negative errors, i.e., at high confidences the method will produce few false positives but more false negatives; conversely at very low confidences the method will produce few false negatives but many false positives.

Hits for the different ways of specifying a time period (i.e., blocks 802, 803 and 804) are fed into processing unit 820, which implements the "ANY" function. Boolean operations strictly process two inputs to generate a single output. By contrast, the "ANY" and "ALL" combination functions work with any number of inputs to generate a single output. Block 820 operates such that a hit on any of the inputs to block 820 results in a compound hit for the TIME concept represented as block 830. As illustrated, the compound TIME hit 830 is given a score corresponding to the maximum of the input hit scores from blocks 802, 803 and 804, and a time interval of the corresponding best input hit. Other operations are possible.

The processing described in the embodiment of FIG. 8 continues with searching for words indicating a reversal. Blocks 805 and 806 are search processes for exemplary words indicating a reversal. The hits found by blocks 805, 806 are optionally thresholded by blocks 810, and are then fed into processing unit 822, which implements the "ANY" function. Blocks 810 may operate with independent threshold values, which may depend upon a characteristic of the respective phrase, such as its length. A longer phrase may have a lower threshold because a hit is less likely to be the result of random chance. Block 822 operates such that a hit on any of the inputs to block 822 results in a hit on block 832, which represents a compound hit for the REVERSE concept. As illustrated, the compound REVERSE hit 832 is given a score corresponding to the maximum of the input hit scores from blocks 805 and 806. Other operations are possible.

Any hits for the compounds blocks 830 and 832, and for the word "you" at block 800, which were detected by the corresponding threshold units, are passed to block 840. Block 840 declares a hit on the compound "COOLING OFF" (block 850) if and only if hits have occurred for ALL three input constituents WITHIN a predetermined time window (e.g., 2 seconds). Additional problem-specific processing may occur, such as associating a geometric mean of the input scores with that hit. The time interval for a compound block is the time interval spanning the time intervals of the input hits to the compound block. Other combination functions for score and time interval may be possible, depending upon the nature of the problem.

Figure 9A:
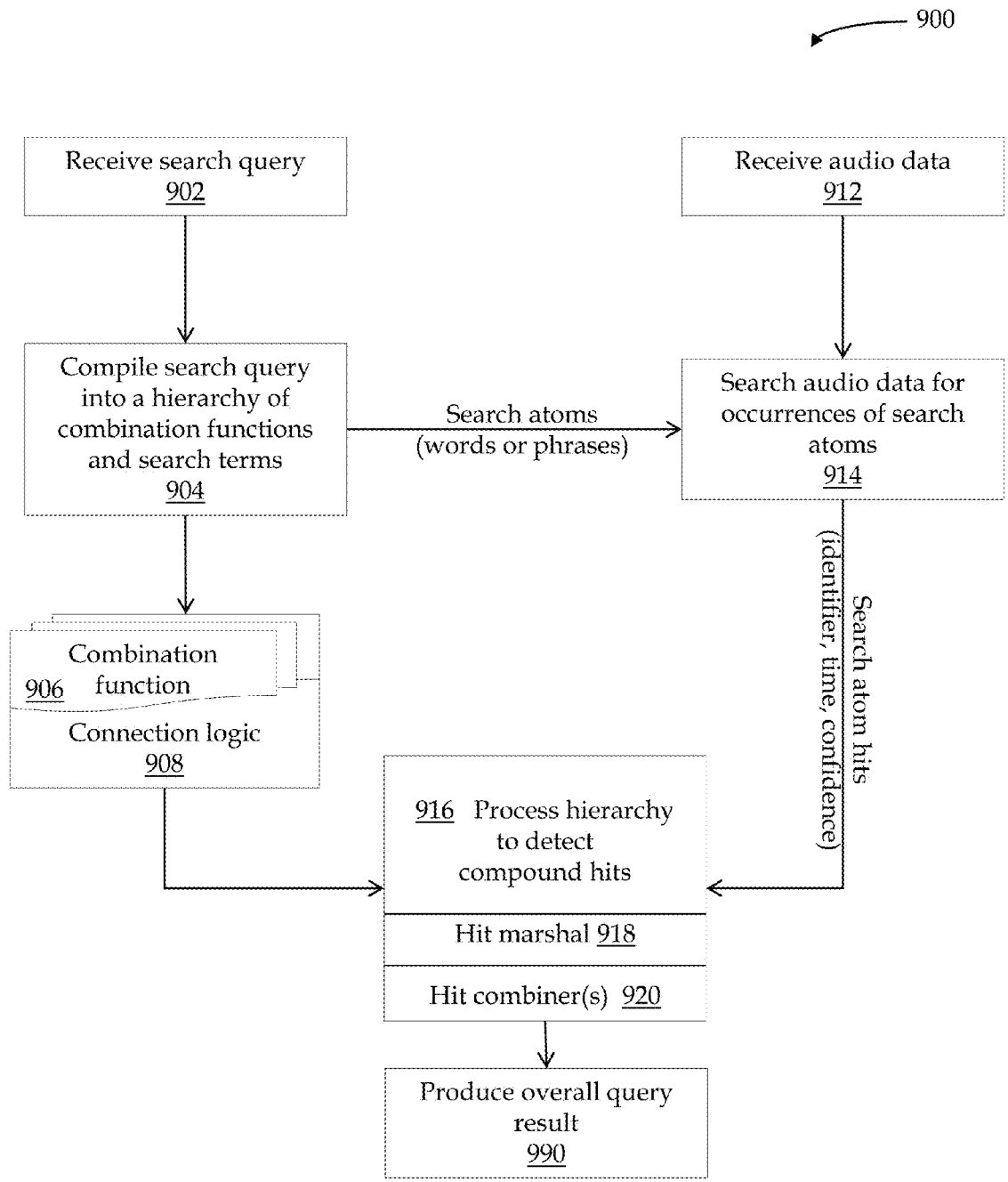
FIGS. 9a-9d are exemplary flow diagrams in accordance with an embodiment of the present invention.

FIG. 9*a* is an exemplary process 900 for searching for audio portions of an audio-containing file and combining occurrences of the detected audio portions into an overall relevancy score. At block 902, a server 110 may receive a simple or compound search query requesting a result based on the occurrences of one or more search terms within audio data. The search query may be received directly from a file or input device coupled to server 110, indirectly from a client device 160, or indirectly from any other node on network 150. At block 904 the search query is translated or compiled from a human readable form into an appropriate form (comprising combination functions 906 and appropriate linking logic 908 to describe how hits are passed into and among the combination functions) for subsequent machine processing. Further, the set of words and phrases embedded in the query, denoted in FIG. 9*a* as "search atoms" is extracted to be passed to the audio search engine 914. For example, the World Wide Web Consortium ("W3C") Augmented Backus-Naur Form ("ABNF") recommendation for speech recognition grammars (SGRS 1.0) may be adapted by incorporating definitions for ANY and ALL_WITHIN functions. If that were done, then the query being processed in FIG. 8 (excluding the threshold processes 810 for simplicity) may be specified by the text shown in Table 1.

TABLE 1

```
root $cooling_off;
    $time = ANY("two weeks","fourteen days","366 hours");
    $reverse = ANY("change your mind","cancel the contract");
    public $cooling_off = ALL_WITHIN(2,"you",$time,$reverse);
```

The W3C speech recognition grammar recommendation also describes a concept of reusable fragments, so that anything declared as public in one grammar fragment can be re-used in another. This idea may be useful in specifying search queries. For example, there are many ways of speaking a date, and a re-usable "date" component would be beneficial in some applications.

An embodiment using more sophistication in the translation process may be to list all the possible word sequences and require the translation process to determine the most efficient way of representing those possible word sequences as a search hierarchy.

The language of at least steps 902-908 is largely implied by the words and phrases embedded in the search query. At least steps 902-908 are independent of the particular type of audio and may be performed before any audio data is present.

At block 912 server 110 may receive audio data that includes speech data from one or more speakers. This is passed to the audio search engine 914, which performs processing appropriate to the language, dialect, bandwidth and quality of the audio signal in order to transform the audio signal into a sequence of search hits for the search atoms. The language, dialect, bandwidth and quality may be determined by analysis of the audio signal and/or from associated metadata. At block 916, the hierarchy is processed to determine whether there are any hits based on the search query. The final result block 990 is a series of hits on the overall query, including an identifier for the overall query, a computed time interval and a computed score. It will be known to one skilled in the art that multiple compound queries may be processed at the same time, with computational advantages when they have any constituents in common.

Figure 9B:
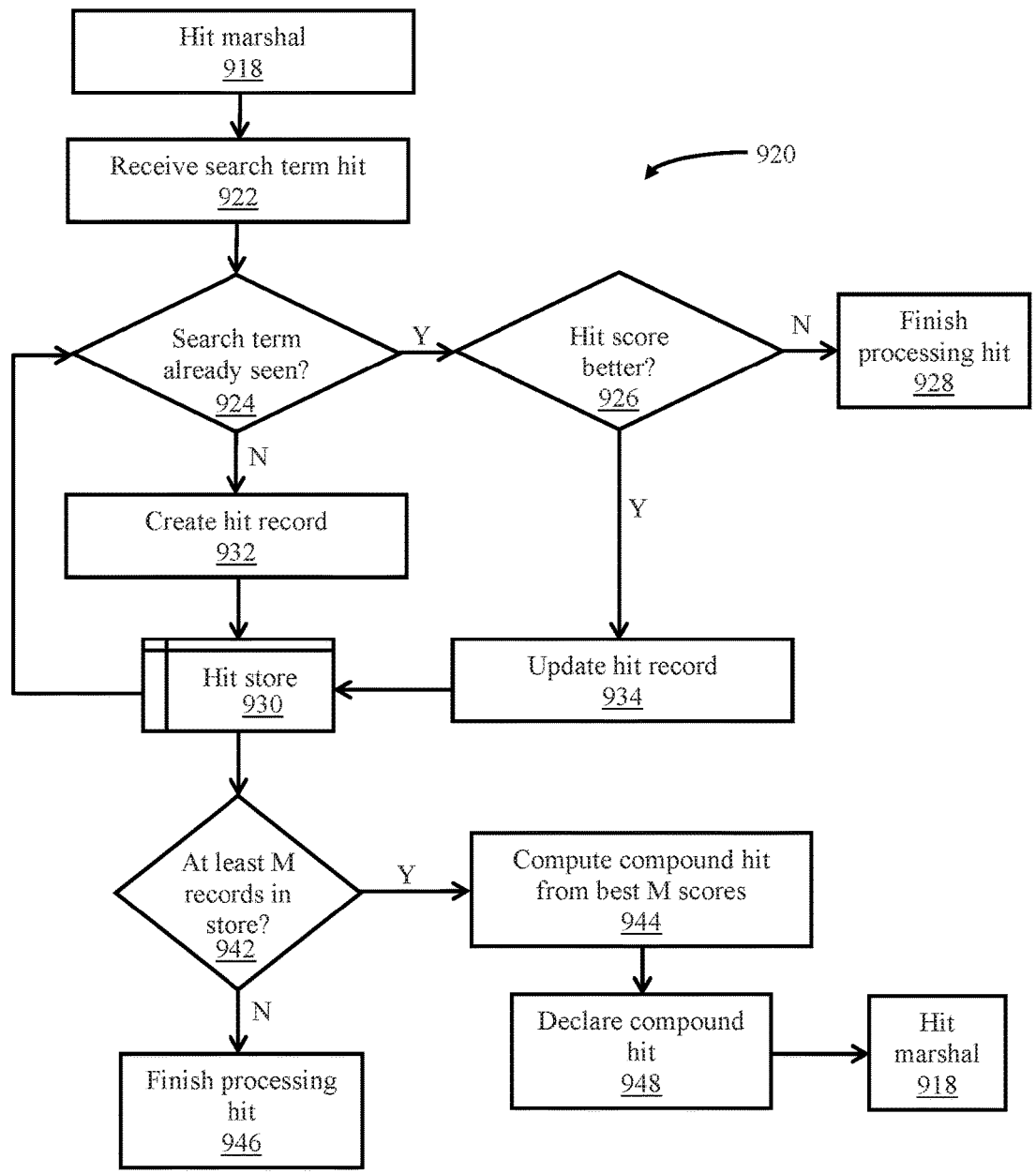

Step 920 of FIG. 9*a* may be described in greater detail by the embodiment of FIG. 9*b*. Corresponding to the connection logic 908 a hit marshal process 918 is responsible for receiving search hits and passing them on to combination functions which expect to process those particular hits. The search hits may be search atom hits from the audio search engine 914 and/or search compound hits output from one of the hit combiners 920 which implement the individual combination functions 906. FIG. 9*b* illustrates the operation of one such hit combiner 920 for the case of "at least M of N specified search terms", with no time constraint.

It will be appreciated by one skilled in the art that the hit marshal 918 is merely one way of implementing such a network of processing units. For example, in an alternative implementation, the connection logic among combination functions might be made visible to the combination functions, so that a hit combiner 920 has a list of successors to which any hits are reported directly.

In FIG. 9*b*, a hit is received at block 922 from the hit marshal process 918. At block 924 it is determined whether a previous hit for that search term has been found within the current audio stream. If a previous hit has been seen, then the relevancy score for the compound hit will not be affected unless the new hit has a better relevancy score. Therefore blocks 926 and 928 discard hits which score no better than what has already been seen. Otherwise, the search hit is recorded in hit store 930. If the new hit is for a term not previously seen, block 932 constructs a new hit record and inserts it into the hit store 930. If a new hit for a particular term which has been seen before does have a better score, block 934 updates the corresponding hit record in the hit store 930.

This initial processing is completely general across all combination function types. For the "M of N" case, it is convenient to organize the hit store 930 so that search records may be retrieved efficiently by search term identifier in order to support tests 924 and 926.

It should be noted that ANY can be expressed as at least 1 of N" and ALL can be expressed as at least N of N", although some optimizations may be possible for these end cases. For example, for the ANY case, the hit store need only contain at most one record and the identifier of the incoming search hit may be ignored.

Further, Boolean operations will perform a similar process with N=2, which again may allow a slightly more efficient implementation of the hit store within each operation. The relative efficiency of embodiments in accordance with the present invention derive because, in order to implement the processing for the query shown in FIG. 5, for example, there are 5 hit combination functions, each of which will receive and store hits from the hit marshal and potentially return compound hits to the hit marshal. In the at least 2 of 3" case shown, each search atom hit is stored twice; for at least 2 of N" this becomes N−1 times, adding considerable handling overheads compared to the single operation required for an implementation according to embodiments of the present invention.

Returning to the processing of FIG. 9b, once a hit record has been added to or updated in the hit store 930, test 942 checks to see whether there are hits for enough distinct search terms. If there are insufficient distinct hits processing for the current hit terminates at block 946, otherwise block 944 computes the score and time interval for the compound hit based on the best M such hits. For this purpose it is convenient to maintain a secondary index into the hit store 930, sorted according to relevancy score, so that the best M may efficiently be retrieved by block 944 when required. If there are hits for more than M distinct search terms, then block 944 may also implement the modified score combination as described earlier. The compound hit is then returned to the hit marshal 918 by block 948. In another embodiment, the requirement that the M hits should be for distinct search terms may be relaxed, so that block 942 would check whether there are at least M hits stored, some or all of which may correspond to repeated hits for the same search term.

As described, without any time constraints, this process will typically return a sequence of hits for the same compound query, with increasing scores. This may be appropriate for a real-time or streaming application, but for a batch application it may be convenient to defer reporting any hits until the end of audio has been reached.

Figure 9C:
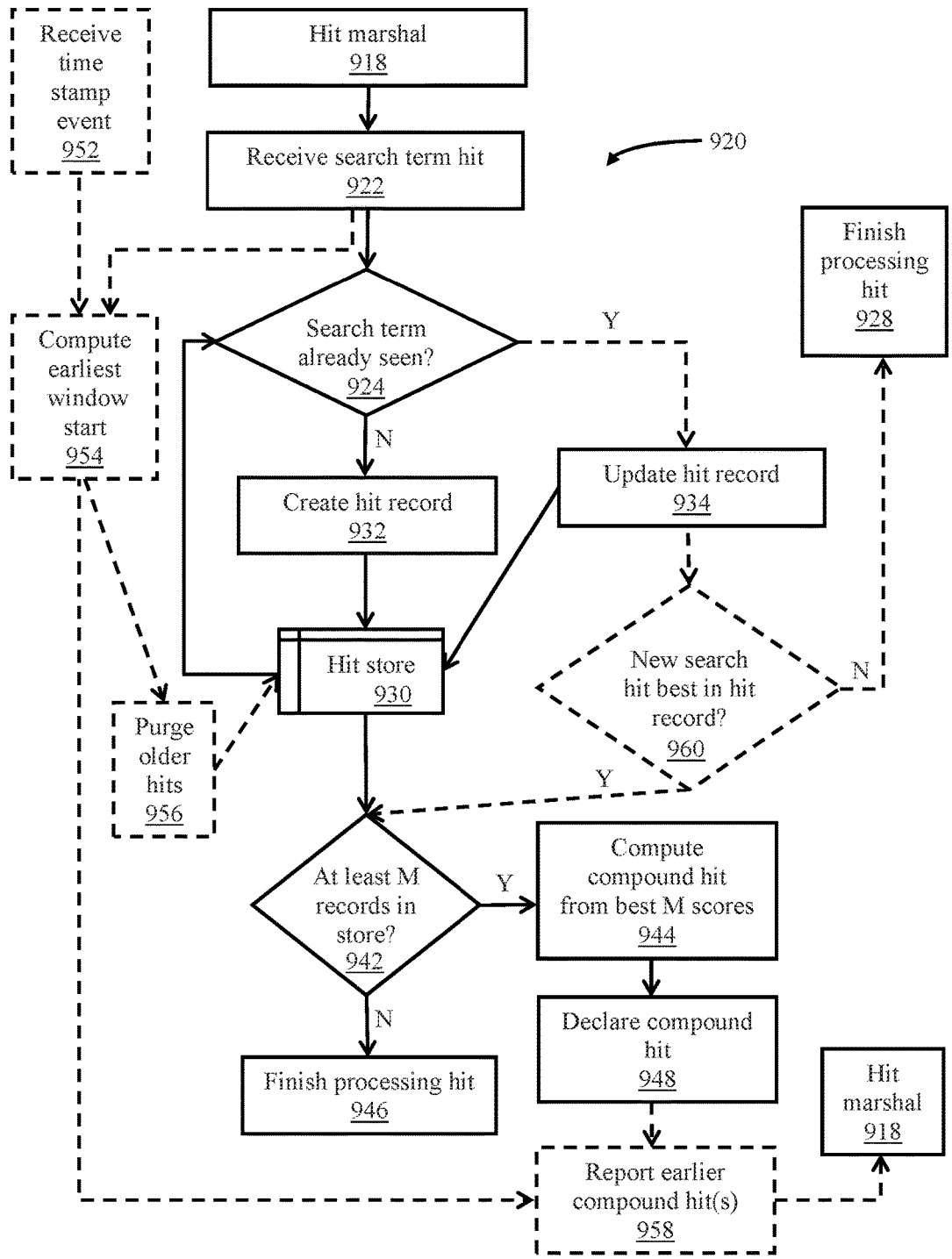

If the combination function includes a time window parameter, then the processing may be varied to take account of the time window. Accordingly, one embodiment is illustrated in FIG. 9c, in which additional stages are shown with dashed lines for ease of comparison. When a new search hit is received, then the earliest possible start time for a time window involving that new hit may be computed from the end time of the new hit and the duration of the time window at block 954. This earliest start time is then used at block 956 to remove from the hit store 930 all hits with a start time before that allowed earliest start time, as such hits can no longer contribute to a new compound hit. This means that hits with lower scores than an earlier hit should not be discarded, as in the processing of FIG. 9b. Instead, all the hits for a given search term are retained in the corresponding hit record by the update process at block 934. If the new search hit is better than any remaining in the hit record after the purge operation of block 956 and further there are at least M active hit records, then a new and better compound hit can be declared. This is accomplished by the path through block 960 to block 942.

In order to avoid reporting repeated hits with increasing scores for a compound query, compound hits declared at block 948 are stored and a compound hit is only reported to the hit marshal 918 by block 958 once the current earliest window start 954 is after the start time of that compound hit, at which point no further improvements in relevancy are possible. In a streaming or real-time system it may be desirable to "flush out" such hits as soon as there is no possibility of further change, which in some embodiments may be accomplished by passing a periodic time stamp, for example once per second of processed audio, to the process at block 952. This allows both purging of the hit store at block 956 and reporting at block 958 of any hits stored at block 948 which can no longer be improved by subsequent search term hits.

It will be known to one skilled in the art that the processing could also be performed in other ways, for example a "search-atom-led" manner, in which individual search atoms are searched for one at a time, with searching and subsequent processing terminating as soon as it becomes apparent that there is no possibility of producing the target compound hit. For example, returning again to FIG. 8, suppose that the system has conducted searches for "change your mind" and for "cancel the contract" and found a number of hits for those search terms and equivalently for the compound REVERSE. Then searches for subsequent terms feeding into the TIME compound may be constrained to a two-second region around the hits for REVERSE. If no such TIME hits are found, then the search may be terminated without conducting a search for "you".

Figure 9D:
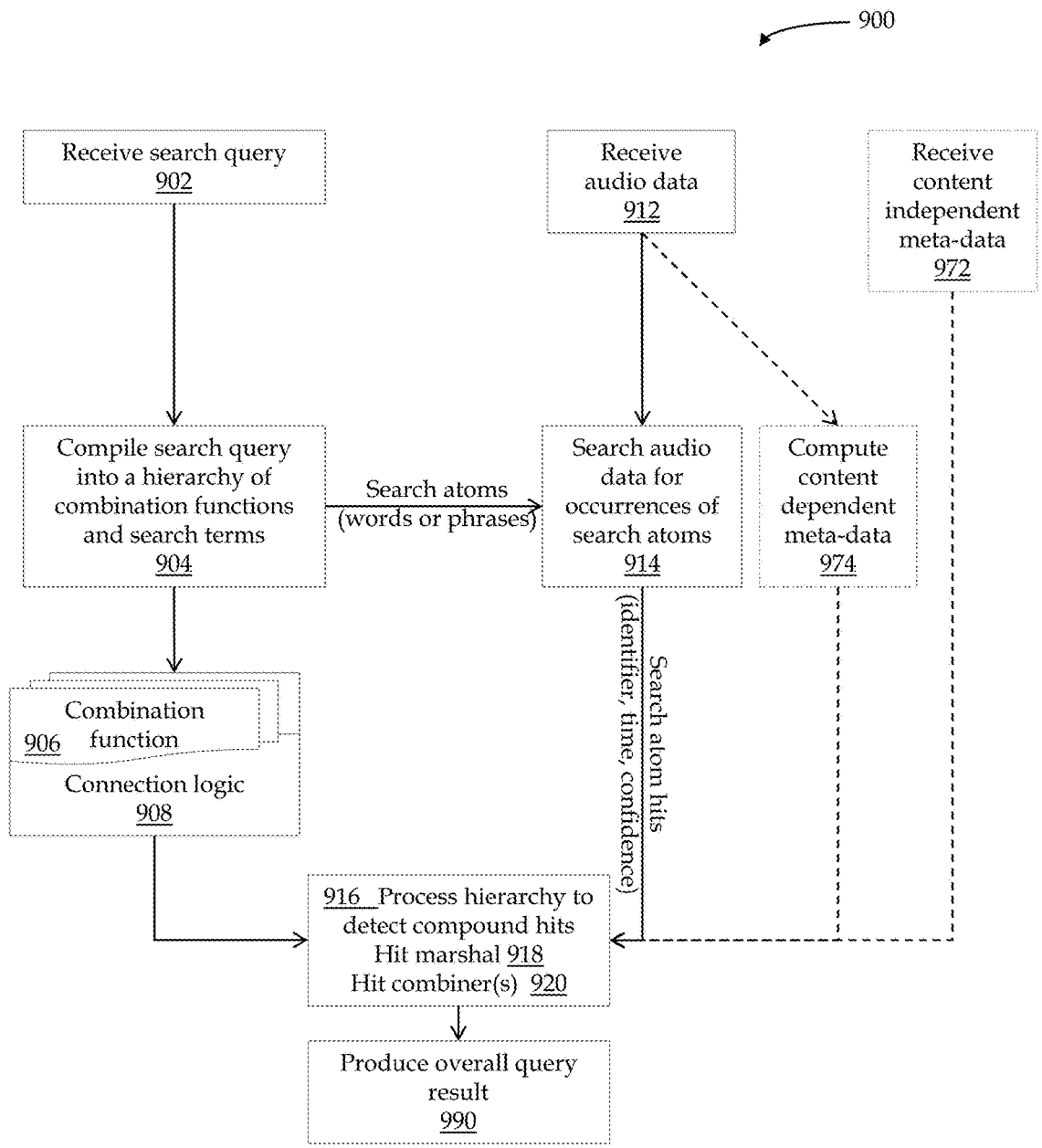

FIG. 9d illustrates another optional component of the process in accordance with an embodiment of the present invention. Audio data may be received at block 912, and associated attributes (e.g., metadata) may be received at block 972, from server 110 or from one or more other nodes connected to network 150. Alternatively or in addition, block 974 may extract attributes from an audio-containing file by methods well known in the art. Attributes of an audio-containing file may include both content-independent metadata and content-dependent metadata.

Content-independent metadata that are independent of the content of the audio-containing file may include, for example, duration, time, day, or caller demographics.

Content-dependent metadata may apply only to segments within an audio stream and may further include one or more scores (e.g., a confidence score, correlation, or the like) that indicate the certainty with which that metadata attribute is identified within the audio stream or within a predetermined segment within the audio stream. For example, a speaker attribute such as an identity of a speaker during a call may be determined by methods well-known in the art. Furthermore, the speaker attribute may be associated with metadata that identifies one or more time intervals in which the speaker was talking, and may further include a confidence score indicating an expected accuracy of such identification.

These attributes may be handled similarly as search hits for particular phrases, described in relation to FIGS. 8 and 9. However the handling of time interval information is different. When a compound hit is declared based on a number of search hits at block 948, the corresponding time interval is typically an interval spanning the component hits. When search hits are combined with attributes, it is typically necessary that a given attribute is present during the time interval applying to each of the input search hits, but the compound search hit is not expanded to cover the whole duration for which the attribute applies, i.e., the time interval of the compound hit is not a superposition of the time interval of the attribute with the time intervals of the input search hits. Referring to FIG. 8, in some embodiments the potential search hits for the search atoms 801-806 are rejected unless the speaker identity was the identity of the agent. In some embodiments, the constraint may be applied at a higher level, for example requiring that the speaker identity attribute remains that of the agent throughout the interval spanned by the composite "COOLING OFF" 850.

Combining attribute scores with hit relevancy scores may use a similar algorithm to those used for combining hit scores, for example geometric mean.

In another embodiment in accordance with the present invention, at block 944, server 110 may combine a plurality of attributes and/or search hits that are each associated with a score and time interval to generate a composite result using a logistic transformation. The composite result may be an attribute with an associated score and/or one or more associated time intervals. The result score may depend on the input scores through a non-linear logistic expression of the form as shown below in Equation (2):

$$L_{ab}(x) = \frac{1}{1 + e^{a(x-b)}} \quad (2)$$

where x is a vector of scores associated with attributes of an audio-containing file and search hits within the audio, and a and b are vectors of the same dimension as the vector of scores, which may be chosen by the user to achieve a desired response to particular combinations of input scores. Vectors a and b may also be trained or adapted using labeled data and known statistical or machine learning techniques, for example logistic regression. Logistic regression provides an optimum or near-optimum function among all functions of the form of Equation (2) for separating future data into those two classes. The labeled data may be obtained, for example, from user feedback indicating the correctness of the returned hits, i.e., a user assessment of the correctness of the calculated composite result (e.g., $L_{ab}(x)$) to the user's assessment of the presence of the object of the search query.

For example, referring to the example data of FIG. 8, an audio-containing file may be associated with multiple attributes each of which represents a hit for the search term "two weeks," or its equivalents (blocks 803 and 804), depending upon the level at which speaker attributes are merged. Similarly, the audio-containing file may be associated with multiple attributes each of which represents the property that the call center agent is speaking during a predetermined time interval. The attributes representing hits for "two weeks" may be combined with the attributes indicating that the call center agent is speaking in order to generate a composite score. That is, the scores associated with each attribute and/or search term may be input into the non-linear logistic expression. The result of the non-linear logistic expression in this example corresponds to a composite score and associated time intervals for all of the search hits associated with the string "two weeks" which occurred during intervals when the speaker identification process deemed the speech to have come from the call center agent. The logistic expression may be used wherever scores are combined, for example the composite score computed at block 840 in FIG. 8 may use a logistic transformation instead of the geometric mean.

The construction of multiple layers of logistic expressions is similar to processes in machine learning and therefore training algorithms from that field, such as "back propagation", could be used to train the distinct parameter vectors a and b for each of the several logistic transformations.

Returning to FIG. 9c, at block 944, server 110 may apply a windowing expression to the scores and time intervals of any combination of search term hits that may need to occur within a given time period. For example, referring again to the example data of FIG. 8, the search terms relating to time (i.e., "two weeks", "fourteen days" and "366 hours") may be required to produce a hit within a one second window of a hit for search terms relating to cancellation (i.e., "cancel the contract" and "change your mind"). Accordingly, a windowing function may be applied to scores and associated time intervals to enforce such a windowing constraint and may result in a composite result. Traditional time windowing may use a hard window, which may be thought of as multiplying the scores by a value of 1 to leave them unchanged if the time data associated with the hit lies within the window, otherwise multiplying by a value of 0 which effectively deletes the hit. As such, a hit within a time window that partially falls outside of a hard window or completely falls just outside the window may be ignored. Therefore, a soft-edged window (i.e., windowing expressions that exhibit a slope at the edges of the window) may be beneficial.

There are two benefits of soft-edged windows: first, a soft edge allows a degree of "lenience" in time if the specified combination of constituents occurs just fractionally outside the desired time interval.

Secondly, the soft-edged windows are better suited to the training and adaptation techniques used in machine learning. For example: suppose that the initial specification for the time window in FIG. 8 is two seconds, but that many of the operators cannot quite manage to get even the shortest form of the words out within that time. If the "lenience" allowed more time for additional matches, e.g., up to three seconds, then these additional matches would be returned as hits, although the scores would be reduced because the hits have exceeded the target time. If an operator subsequently reviews those hits and marks them as correct, then an adaptive system could then make use of that information to increase the target time.

A time windowing expression may include various types of non-linear expressions, including logistic and spline functions. It is beneficial to look for a function which is zero outside some wider time interval (such a function is said to have "finite support"), because such a function allows search hits outside that time interval to be ignored, with resulting efficiency gains. Spline functions, for example cubic Hermite splines or x-splines, may be constructed to have finite support. Controlling certain parametric control values of a spline function may result in a window that appears as an approximation to a rectangular time window. For example, a cubic Hermite spline may be defined by four control points, where the value of the first derivative at each control point is zero. Furthermore, the value of the spline function may be defined at each control point. An x-spline is preferred for an adaptive system because it is a form of x-spline that may be differentiable in the locations of the control points, which person skilled in machine learning will appreciate is an important property for adaptation.

Figure 10:
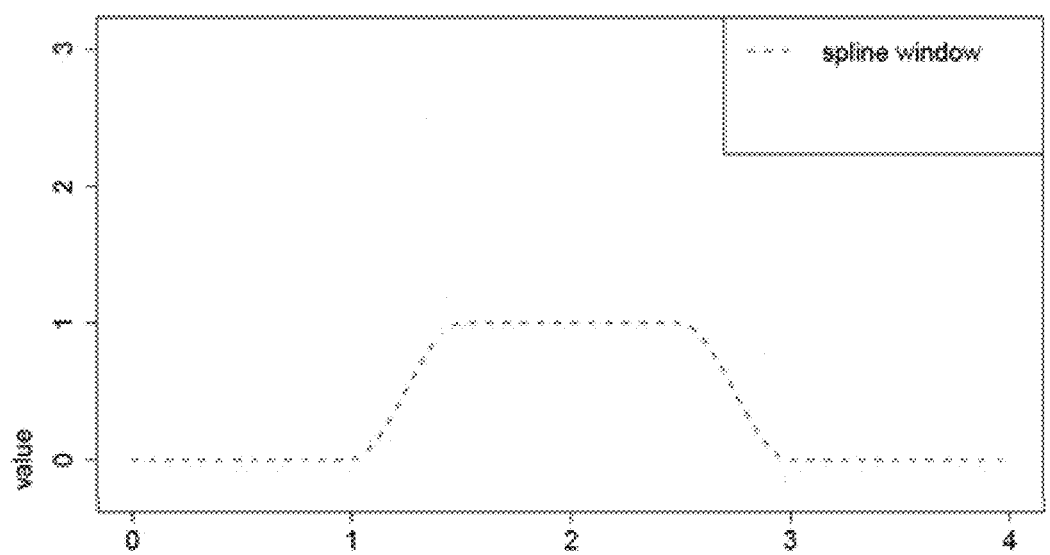
FIG. 10 is an exemplary graph of a spline function in accordance with an embodiment of the present invention.

FIG. 10 is an exemplary illustration of a cubic Hermite spline with control points at x=1, 1.5, 2.5, and 3, where x represents a time in seconds The values of x are relevant here only in that they define the shape and duration of the time window, because this window is applied as a sliding window to the sequence of search hits. The values at each of these control points may be set to predetermined values, e.g., 0, 1, 1, 0, respectively, in FIG. 10. The use of control value 0 for the endpoints ensures finite support. Preferably, the control points are further constrained by defining the first derivative as zero at each control point, in accordance with FIG. 10, ensuring continuity of the first derivatives at those points. The resulting spline expression may be used as a multiplicative time window for search hit relevancy scores, in which the use of control values 1 for the central region is preferable so that if all the hits occur in the central region where the control value is 1 then there is no penalty, but hits with time intervals extending into the half second either side would be penalized accordingly, for example by multiplying the score for the hit by the value of the window at the most extreme end of the hit. Similar to the result of a logistic transformation, the result of a windowing function offers a composite score associated with one or more time intervals.

The query representation of Table 1 may be further extended to include the non-linear functions. For example, a query using the example data of FIG. 8 may include the statements illustrated in Table 2:

TABLE 2 nonlinear $NLtop=logistic(1,, 0.7, 1, 0.6, 1, 0.5);
nonlinear $NL3=logistic(1, 0.5, 1, 0.5, 2, 0.8);
nonlinear $NL2=logistic(1, 0.5, 2, 0.3);
nonlinear $window=chsw(1, 1.5, 2.5, 3);
root $main;
$time = THRESHOLD(1,"two weeks","fourteen days","366 hours",$NL3);
$reverse = THRESHOLD(1,"change your mind","cancel the contract",$NL2);
public $main = THRESHOLD(3,"you",$time,$reverse,$window,$NLtop);

In the above expressions, "logistic(1, 0.5, 2, 0.3)" represents a logistic transformation expression with two input scores, a=(1,2) and b=(0.5,0.3), whereas chsw(1, 1.5, 2.5, 3) represents a cubic Hermite spline window with control points 1, 1.5, 2.5, and 3 and implicitly zero derivatives at those control points. The THRESHOLD operator in this example may be defined by four types of parameters, including:

1) A minimum number of hits required to satisfy the THRESHOLD operator;

2) A sequence of items which are either primitive search strings (e.g., "two weeks" or "change your mind"), metadata relating to the audio material or previously composed items (e.g., $time or $reverse);

3) An optional windowing function (e.g., the chsw function) that uses the sequence of items as input; and 4) A non-linearity that takes the sequence of items and/or result of the windowing expression as inputs.

The result of the THRESHOLD operator in the above example is a composite score with associated time intervals. As discussed above, the result of a particular THRESHOLD operator may be used as an input to another THRESHOLD operator. As a result, composite scores may be propagated through a hierarchy of statements.

One advantage of the disclosure is to provide a concise method for specifying that at least M of some number N of possible search terms have been found within some audio stream or time interval within the audio stream. This may be accomplished by combining hits associated with multiple search terms using logistic transformation, as discussed herein. Furthermore, determining whether particular search terms occur within a certain time frame from one another may be done using a windowing expression such as, for example, a cubic Hermite spline. Results from one or more combinations of search terms using logistic transformation may be combined with additional search terms in a hierarchical manner.

Figure 11:
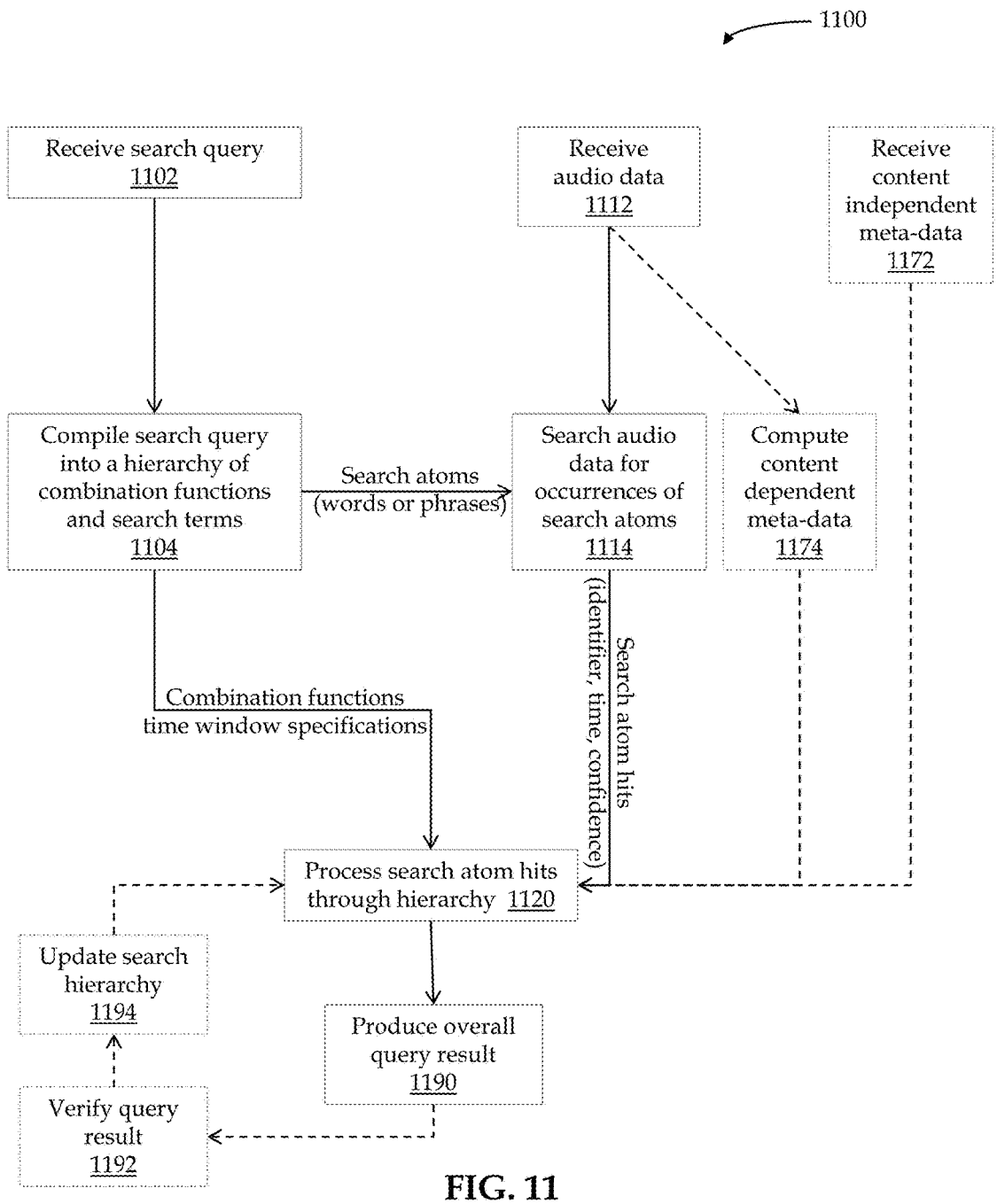
FIG. 11 illustrates a flow diagram at a relatively high level of abstraction, in accordance with an embodiment of the present invention.

FIG. 11 illustrates a method 1100 at a relatively high level of abstraction, in accordance with an embodiment of the present invention. Method 1100 begins at step 1102, at which a search query is received. Next, at step 1104, the search query is compiled into a hierarchy of combination functions and search terms. Search atoms (i.e., words or phrases) from step 1104 are provided to step 1114, and combination functions with their time window specifications are provided to step 1120.

Concurrently with at least some of the steps described so far in method 1100, audio data is received at step 1112. At step 1114, the audio data from step 1112 is searched for the occurrence of atoms supplied from step 1104. The result of step 1114 is provided to step 1120.

At step 1120, hits for the search atoms (provided from step 1114) are processed through the hierarchy of combination functions provided from step 1104. The result of step 1120 is provided to step 1190.

At step 1190, an overall result of the query is produced. Optionally, in some embodiments in accordance with the present invention, the overall query result from step 1190 may be used in a feedback mechanism to improve the system. For example, the overall query result may be provided to step 1192 at which the overall query result is verified. The verification may be provided to step 1194 at which the search hierarchy is updated. Thereafter, future invocations of step 1120 will use the updated search hierarchy.

Optionally, in some embodiments in accordance with the present invention, content-independent metadata may be received at step 1172. The content-independent metadata may be received concurrently with at least a portion of the step of receipt of audio data at step 1112 and/or the step of searching of audio data at step 1114. The content-independent metadata from step 1172 may be used in step 1120 during the processing of the search atom hits.

Optionally, in some embodiments in accordance with the present invention, at step 1174 the audio data received at step 1112 may be processed in order to compute content-dependent metadata. The content-dependent metadata so computed is then supplied to step 1120 for use during the processing of the search atom hits.

Embodiments of the present invention include a system having one or more processing units coupled to one or more memories. The one or more memories may be configured to store software that, when executed by the one or more processing unit, implements processes described above.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to search audio data, comprising:
    receiving, by a server, audio data representing speech;
    receiving, by the server, a search query related to the audio data, the search query comprising a plurality of search terms;
    compiling, by the server, the search query into a hierarchy of scored speech recognition sub-searches;
    searching, by an audio search engine executing on the server, the audio data for speech identified by one or more of the sub-searches to produce hits, each hit being associated with a respective search term in the search query;
    determining, by the server, whether to record each hit in a hit store, wherein a particular hit is recorded only when no previous hits associated with the respective search term are found or when a relevancy score of the particular hit is higher than a relevancy score of all previous hits associated with the respective search term;
    determining, by the server, whether the hits recorded in the hit store exceed a predetermined number; and
    when the hits exceed the predetermined number, combining, by the server, the hits by use of at least one combination function to provide a composite search score of the audio data, wherein at least one of the combination functions comprises an at-least-M-of-N function, the predetermined number of hits comprising hits for at least M members of a set comprising N members, wherein N is greater than or equal to M, and wherein the composite search score is determined based on the M members having a highest relevancy score.

2. The method of claim 1, wherein the high score is produced by applying a transform function to at least one of N function inputs.

3. The method of claim 1, wherein the at-least-M-of-N function comprises an ALL-function, wherein the ALL-function produces a high score when all inputs to the at-least-M-of-N function exceed the predetermined threshold value within a predetermined time window.

4. The method of claim 1, wherein the search query comprises one or more search terms and each hit comprises an identifier that indicates a match to one or more of the plurality of search terms, a time interval over which the match is declared, and the relevancy score.

5. The method of claim 4, further comprising:
    applying, by the server, a respective threshold to one or more of the hits obtained from the step of searching the audio data for speech identified by one or more of the sub-searches; and
    blocking, by the server, the hits having relevance scores below their respective threshold.

6. The method of claim 1 wherein the audio data comprises content-dependent metadata and content-independent metadata.

7. The method of claim 6 wherein the content-dependent metadata comprises: an identification of a predetermined speaker; a time interval during which the speaker was speaking; and a quality score of the identification of the predetermined speaker.

8. The method of claim 1 wherein the composite search score comprises an attribute with an associated score and one or more associated time intervals.

9. The method of claim 1 wherein the composite search score may be determined in accordance with the following relationship:

$$L_{ab}(x) = \frac{1}{1 + e^{a(x-b)}},$$

wherein:
    x comprises a vector of scores associated with the hits;
    a and b comprise sensitivity vectors; and
    $L_{ab}(x)$ comprises the composite search score.

10. The method of claim 9 wherein the sensitivity vectors are obtained from user feedback that indicates a correctness of the composite search score.

11. The method of claim 10, further comprising: self-learning, by the server, of the sensitivity vectors based upon the user feedback.

12. The method of claim 1, further comprising: scoring, by the server, the speech recognition by use of a soft time window.

13. The method of claim 12 wherein the soft time window comprises a window definable by a spline function.

14. A system to search audio data, comprising:
    a computer-readable storage medium, storing executable instructions;
    a processor in communication with the computer-readable storage medium, the processor when executing the executable instructions:
    receives audio data representing speech;
    receives a search query related to the audio data, the search query comprising a plurality of search terms;
    compiles the search query into a hierarchy of scored speech recognition sub-searches;
    searches, by an audio search engine executing on the processor, the audio data for speech identified by one or more of the sub-searches to produce hits, each hit being associated with a respective search term in the search query; and determines whether to record each hit in a hit store, wherein a particular hit is recorded only when no previous hits associated with the respective search term are found or when a relevancy score of the particular hit is higher than a relevancy score of all previous hits associated with the respective search term;

determines whether the hits recorded in the hit store exceed a predetermined number; and when the hits exceed the predetermined number, combines the hits by use of at least one combination function to provide a composite search score of the audio data, wherein at least one of the combination functions comprises an at-least-M-of-N function, the predetermined number of hits comprising hits for at least M members of a set comprising N members, wherein N is greater than or equal to M, and wherein the composite search score is determined based on the M members having a highest relevancy score.

15. The system of claim 14, wherein the high score is produced by applying a transform function to at least one of N function inputs.

16. The system of claim 14 wherein the audio data comprises content-dependent metadata and content-independent metadata.

17. The system of claim 14 wherein the composite search score comprises an attribute with an associated score and or more associated time intervals.

18. The system of claim 14 wherein the composite search score may be determined in accordance with the following relationship:

$$L_{ab}(x) = \frac{1}{1 + e^{a(x-b)}},$$

wherein:
  x comprises a vector of scores associated with the hits;
  a and b comprise sensitivity vectors; and
  $L_{ab}(x)$ comprises the composite search score.

19. The system of claim 18 wherein the sensitivity vectors are obtained from user feedback that indicates a correctness of the composite search score.

20. The system of claim 19 further comprising a self-learning module to process the sensitivity vectors based upon the user feedback.

* * * * *